W. A. LEE.
VEHICLE SUPPORT.
APPLICATION FILED APR. 22, 1913.
1,101,640.
Patented June 30, 1914.
2 SHEETS—SHEET 1.
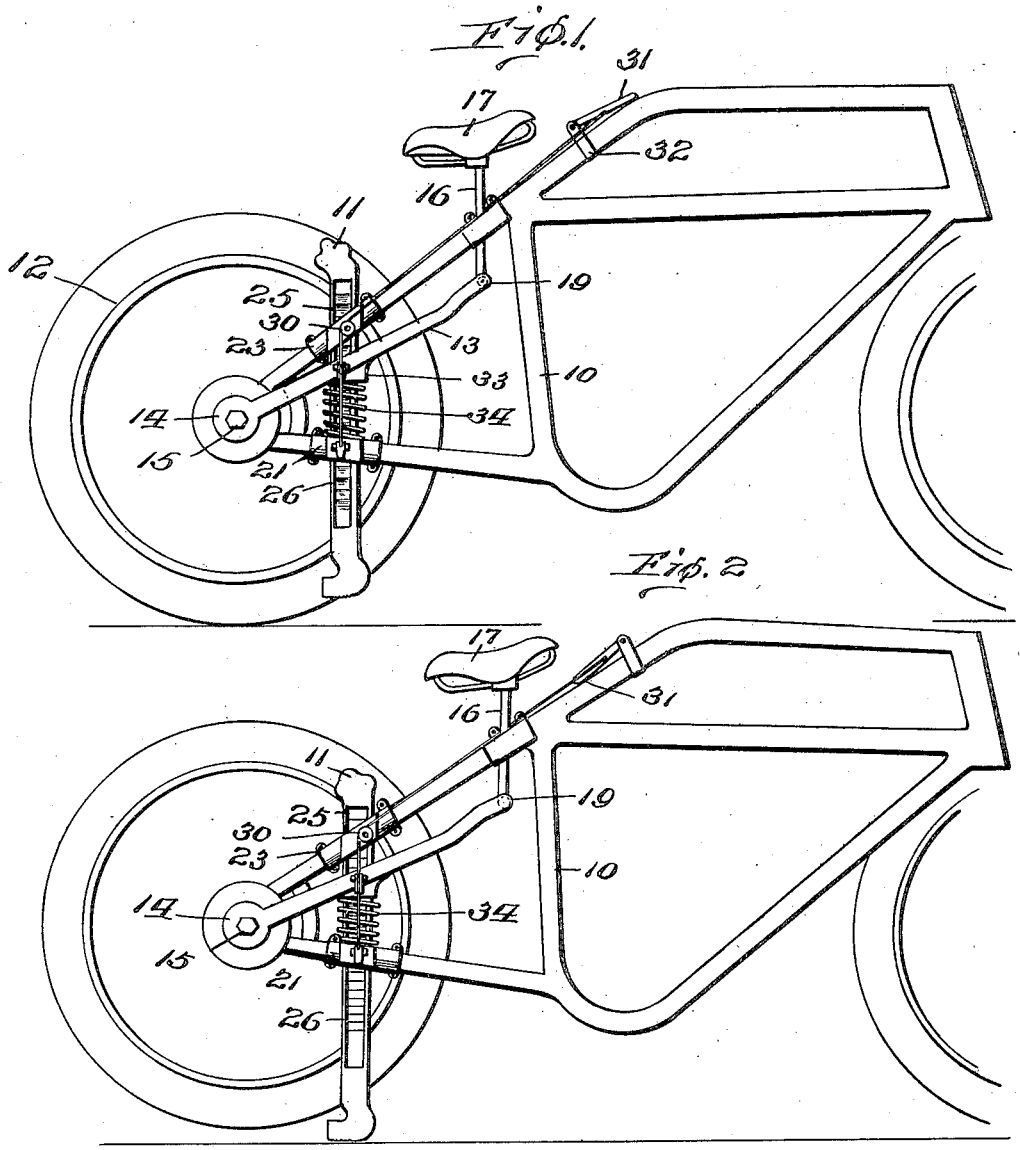

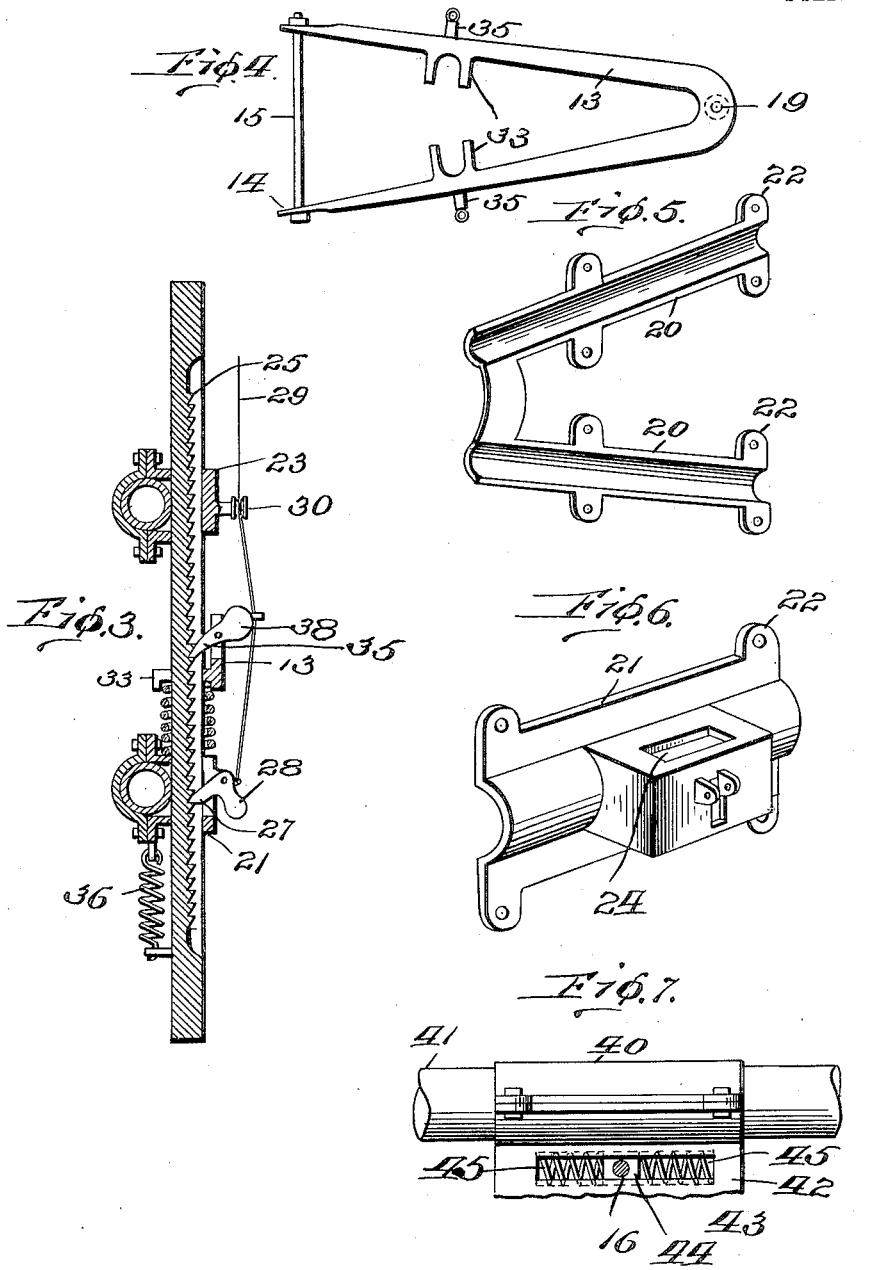

UNITED STATES PATENT OFFICE.

WILLIAM A. LEE, OF WASHINGTON, DISTRICT OF COLUMBIA.

VEHICLE-SUPPORT.

1,101,640.          Specification of Letters Patent.     Patented June 30, 1914.

Application filed April 22, 1913. Serial No. 762,803.

*To all whom it may concern:*

Be it known that I, WILLIAM A. LEE, a citizen of the United States, and residing at Washington, in the District of Columbia, have invented certain new and useful Improvements in Vehicle-Supports, of which the following is a specification.

This invention relates to improvements in vehicle supports, and more especially to such devices adapted for employment with motor-cycles.

An object of the invention is the provision of a lifting means for the power members of a vehicle operable by the weight of the rider and without the necessity of dismounting.

A further object is to provide props carried by the vehicle and having a ratchet operating mechanism therefor.

A still further object is to provide supporting props adapted to support as well as to elevate the vehicle, the same being normally inoperative but positionable for use by means of a saddle operated ratchet mechanism.

The device is also advantageous in the provision of a resiliently pivoted lever for operating by ratchet means, elevating props carried by the vehicle, and adapting said lever as a spring mounting for the vehicle seat or saddle.

In the present provision, mechanism is brought into use whereby an intentional jolting of the rider up and down upon the saddle effects a downward forcing of the supporting props to elevate the power wheel of the vehicle from off the ground.

With these general objects in view and others that will appear as the nature of the invention is better understood, the same consists in the novel combination and arrangement of parts hereinafter fully described, illustrated in the accompanying drawings, and pointed out in the appended claims.

In the drawings forming a part of this application and in which like reference numerals designate corresponding parts throughout the several views: Figure 1 is a side elevation of a portion of a motor-cycle with the present device positioned thereon in its inoperative position. Fig. 2 is a similar view showing the motor-cycle supported by this manner of device. Fig. 3 is a central vertical sectional view taken through one of the supporting props and the adjacently positioned elements. Fig. 4 is a bottom plan view of the forked operating lever detached. Fig. 5 is a perspective view of a portion of the frame attaching means. Fig. 6 is a perspective view of the lower prop bearing, and, Fig. 7 is a top plan view of the improved saddle post mounting, one side thereof being broken away.

Referring in detail to the drawings, it is noted that the present support while applicable for other vehicles, is of most service and utility in connection with motor-cycles, and with this class of vehicles, it is therefore now illustrated.

Mounted upon the motor-cycle frame 10 by means of the bracket means hereinafter described are the supporting and elevating props 11, one of the same being positioned upon each side of the rear wheel 12. The fork shaped lever 13 has its free ends 14 pivotally-mounted upon the opposite ends of the rear axle 15 while at the forward end thereof the post 16 for the saddle 17 is mounted by means of the ball and socket joint 19.

The channel frame 20 shown in Fig. 5 is adapted to be fitted interiorly adjacent to one side of the rear fork in such a position that the journal casing 21 shown in Fig. 6 may be secured thereto by the coöperating ears 22 while an upper casing 23 is carried by the upper bar of the rear fork. Said casings 21 and 23 are substantially identical having the openings 24 positioned therethrough in vertical alinement and adapted for slidingly positioning a prop 11.

Each of the props 11 is provided upon its outer face with a toothed rack 25 for substantially the entire width of the face and positioned between the marginal flanges 26 thereof. The lower casing 21 is provided with the pivoted pawl 27 normally held in engagement with the rack 25 by means of the weight 28 to be releasable therefrom through a pull exerted upon the cord 29 or similar operating means which passes over an anti-friction means or pulley 30 carried by the upper casing 23 and thence to the lock lever 31 pivoted to a collar 32 at any point upon the frame convenient for manipulation from the saddle.

The forked lever 13 is provided with a projecting horseshoe-shaped socket 33 upon its under face and upon each side of the fork for the purpose of receiving the props 11 and mounting the lever resiliently upon the encircling helical springs 34 carried by said props with the lower ends of said springs mounted upon the top of the lower casing 21 and their tops partially seated within said horseshoe-shaped sockets.

A pivoted pawl 35 is mounted upon each side of the forked lever and adjacent the horseshoe sockets 33, said pawls being provided with the weighted projections 36 for normally retaining the pawls in engagement with said rack 25. Said pawls 35 have their ends grooved for the reception of the cord 29 and whereby the pressure exerted upon said pawls 35 by the tension of said cord is adapted to rock said pawls upon their pivots and thus disengage the same from the prop racks. The positioning of the lever 31 as shown in Fig. 1 tightens the cord 29, thus forcibly disengaging the lower rack pawl 27 and by reason of the tensioning of such cord within the groove on the top of the pawl 35, effectually releasing this latter pawl in which position, the prop is free for movement, being normally impelled in an upward vertical direction by the coil spring 36 attached at one end to the casing 21 and at the other end to the rear face of the prop.

With the props upon either side of the motor-cycle in their elevated positions as shown in Fig. 1, a releasing of the lever 31 releases both pawls 27 and 35, thus allowing their respective weights to place said pawls in engagement with the teeth of the rack 25 as shown in Fig. 3. A downward movement then exerted upon the saddle 17 either through a bouncing motion of the rider or by any other power exerted upon said saddle, results in depressing the forward end of the operating lever 13, the pawls 35 of which being engaged with the racks 25 of the two props, results in forcibly shifting both of said props downwardly, and in which lowered positions they are retained by means of the lower locking pawls 27. It is obvious that either one or a greater number of movements may be necessary upon the part of the lever 13 for the purpose of feeding the props for a sufficient distance to contact the ground so as to support the vehicle, while a further downward impulse imparted thereto results in elevating the wheel 12 as shown in Fig. 2. It will be seen that in such elevated position, the motor-cycle may be adjusted or run free without contacting the power wheel with the ground and that a movement of the lever 31 from the position shown in Fig. 2 to that shown in Fig. 1 results in an immediate return of the pawls to the unlocked positions, and of the props 11 to their inoperative elevated positions adapted for the active running use of the vehicle.

The operation of the lever 13 upon the props 11 is a ratchet feeding step by step movement and this may be effected in any manner by imparting reciprocating vertical motion to the seat supporting end of said pivoted lever. The helical spring 34 moreover performs a dual function in that it normally elevates the lever 13 and thereby places the same normally at the upper extremity of its stroke and so as to be in a position for forcible depression, while it also by the same power, normally resiliently supports the saddle post 16 during the running position of the entire mechanism as shown in Fig. 1. A resilient saddle support is thereby provided which functionally embodies a ratchet lever operating means for support props.

For the purpose of increasing the efficiency of the saddle supporting structure, a journaling of the saddle post 16 is provided as is shown in a detailed view, Fig. 7. By this view, it will be noted that a sleeve or collar 40 is secured around each of the parallel bars or tubes 41 of the rear fork of the motor-cycle for positioning an intermediate connecting portion 42 therebetween. Within this portion 42 is provided an internal socket 43 having a rectangular block 44 longitudinally slidable therein and with the seat post 16 vertically movable therethrough. Springs 45 centralize the block 44 being positioned within the socket 43 and upon opposite sides of the block.

From this detailed description of the entire device, the complete operation thereof will be at once apparent. It should be noted that while the exact form of the brackets now disclosed are adaptable to the manner of motor-cycle frame herein illustrated, that the invention may be readily attached to any motor-cycle or bicycle by only slight changes or modifications of the mounting brackets.

While the forms of the invention herein shown and described are what are believed to be preferable embodiments thereof, it is nevertheless to be understood that minor changes may be made in form, proportion, and details of construction without departing from the spirit and scope of the invention as set forth in the appended claims.

Having fully described my invention, and in what manner the same is designed for use, what I claim as new and desire to secure by Letters Patent of the United States is:—

1. A device of the class described comprising in combination with a vehicle frame, vertically movable props carried by said frame, a lever pivoted to said frame, pawls carried by said lever and frame adapted for engaging said props for adjustably shifting the same upon an actuation of said lever.

2. A device of the class described comprising in combination with a vehicle frame, vertically movable props carried by said frame, a forked lever pivoted to said frame, a rack face upon each of said props, pawls carried by said lever and frame in normal engagement with said racks, means for disengaging said pawls from said racks, and other means normally elevating said props.

3. A device of the class described comprising in combination with a vehicle frame, vertically movable props carried by said frame, a forked lever pivoted to said frame, a rack face upon each of said props, pawls carried by said lever and frame in normal engagement with said racks, said props downwardly movable upon a pivotal movement of said lever.

4. A device of the class described comprising in combination with a vehicle frame, vertically movable props carried by said frame, a forked lever pivoted to said frame, a rack face upon each of said props, pawls carried by said lever and frame in normal engagement with said racks, said props downwardly movable upon a pivotal movement of said lever, cord means secured to and engaging said pawls, a pivoted lock lever to which said cord means is attached, means for normally elevating said props, and other means for normally elevating said lever.

5. A vehicle support comprising in combination with a motor-cycle frame and rear axle, of opposite supporting props mounted vertically movable upon said frame, a forked operating lever pivoted to said axle, means for normally elevating said props, means for normally elevating said lever, and pawls upon said lever adapted for engaging said props and shifting the latter upon an actuation of said lever.

6. A device of the class described comprising the combination with a frame, of a prop movably-mounted thereon, a forked lever pivoted to said frame, means for normally elevating said lever, a saddle mounted upon the free end of said lever, and pawls carried by said frame and lever adapted for engaging said prop for shifting the same upon a relative movement between said lever and frame.

7. A device of the class described comprising in combination with a vehicle frame having an axle mounted thereon, a forked lever pivoted to said axle, a seat post, a ball and socket connection between said post and the free end of said lever, an expansion spring between said lever and frame, journaling brackets upon said frame and having alining perforations therethrough, props slidably positioned in said perforations, a toothed rack face upon said props, pawl members upon said lever and frame adapted for engaging said rack face, and means for controlling said pawls.

In testimony whereof I affix my signature in presence of two witnesses.

WILLIAM A. LEE.

Witnesses:
HORACE G. SEITZ,
MILTON E. LOWRY.

---

Copies of this patent may be obtained for five cents each, by addressing the "Commissioner of Patents, Washington, D. C."